United States Patent Office 3,274,188
Patented Sept. 20, 1966

3,274,188
5-AMINOBENZOCARBAZOLES
Stephen Sallay, Wynnewood, Montgomery, Pa., assignor to American Home Products Corporation, New York, N.Y., a corporation of Delaware
No Drawing. Filed Mar. 23, 1964, Ser. No. 354,092
9 Claims. (Cl. 260—247.5)

This invention relates to benzocarbazoles and more particularly to 5-amino-hexahydrobenzocarbazoles and to the method by which said compounds are prepared.

The new compounds of the present invention in their broadest aspect include those encompassed within the formula:

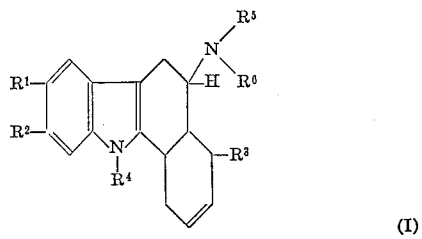

(I)

wherein $R^1$ and $R^2$ are selected from the group consisting of hydrogen, lower alkyl and lower alkoxy and $R^1$ and $R^2$ taken together are $-OCH_2O-$; $R^3$ is selected from the group consisting of hydrogen, lower alkyl and lower alkoxy; $R^4$ is selected from the group consisting of hydrogen, lower alkyl and benzyl; $R^5$ and $R^6$ are selected from the group consisting of hydrogen, lower alkyl, dialkylaminoalkyl and $R^5$ and $R^6$ together form a radical selected form the group consisting of morpholino, thiomorpholino, piperidino, pyrrolidino, piperazino and N-alkylpiperazino together with the pharmaceutically acceptable, nontoxic acid addition salts thereof. In the foregoing, lower alkyl is intended to mean and include straight or branched chain hydrocarbons having 5 carbon atoms or less.

The new compounds of the present invention are prepared by reacting a selected benzocarbazol-5-one (II) with an alkali metal borohydride in the presence of an inert solvent with the resulting 5-ol (III) being further reacted with p-toluenesulfonyl chloride or an equivalent reagent in a basic solvent such as pyridine. The reaction product, a benzocarbazol-5-ol-p-toluene sulfonate (IV) after treating with dilute acid is reacted with an amine to provide the desired final product (V).

A better understanding of the method of the present invention will be obtained by reference to the reaction sequence below wherein the method of preparing a single compound falling within the class defined by Formula I is examplified:

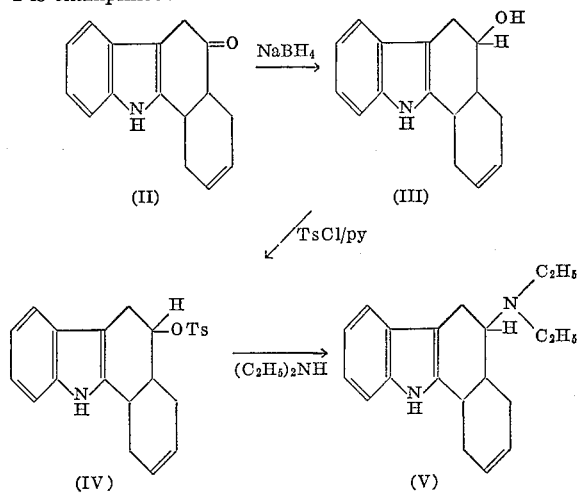

In the foregoing reaction the starting compound 1, 4,4a,5,6,11b - hexahydro - 11H - benzo [a] carbazol-5-one (II) is prepared according to the method described in my copending application Serial No. 354,149 filed even date herewith. Compound (II) is representative of the compounds which are used in the reaction of this invention to prepare the compounds encompassed within Formula I above. In the application referred to, compounds having the formula:

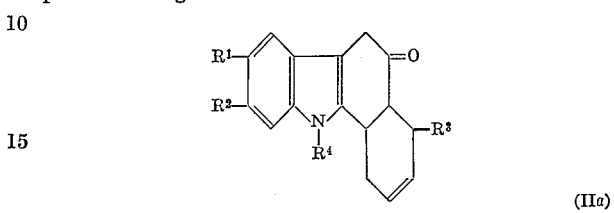

(IIa)

are prepared in which the substituents $R^1$, $R^2$, $R^3$ and $R^4$ have the values ascribed herein. These compounds (IIa) are prepared by reacting a 1,4-naphthoquinone or derivative thereof with phenylhydrazine. The resulting product is then further reacted with an alkali metal halide followed by reaction with an alkyl halide or benzyl halide to provide the desired final products with the $R^4$ substituent as shown at (IIa). It is of course understood that the phenylhydrazine will include the appropriate substituents when $R^1$ and $R^2$ represent other than hydrogen. This aspect of preparing compounds of such configuration is described in the copending application referred to:

The new compounds of the present invention have valuable properties which make them useful as blood pressure depressants. They also possess properties making them useful as anticonvulsant agents.

When used as blood pressure depressants, the new compounds of this invention may be administered alone or in combination with pharmaceutically acceptable carriers, the proportion of which is determined by the solubility and chemical nature of the compound, chosen route of administration and standard pharmaceutical practice. They may be administered orally in the form of tablets or capsules containing such excipients as starch and milk sugar. They may be administered in the form of lozenges in which the active ingredient is mixed with sugar, corn syrups, flavoring agents and dyes. They may be administered orally in the form of solutions which may contain coloring and flavoring agents. They may also be injected parenterally.

The dozage of the present therapeutic agents which will be most suitable will vary with the form of administration and the particular compound chosen, and will also vary with the particular patient under treatment. Treatment will be started with small dosages substantially less than the optimum does of the compound and increase by small increments until the optimum effect under the circumstances is reached. It will generally be found that when the composition is administered orally, larger quantities of the agent will be required to produce the same effect as a smaller quantity given parenterally. The compounds are useful in the same manner as other agents having a similar function and the dosage level is of the same order of magnitude as is generally employed with these other therapeutic agents. The therapeutic dosage may be from 10 to 500 milligrams per day and may be administered in several different dosage units. Tablets containing from 25 to 250 mg. of active agent are particularly useful.

Reference now to the specific examples which follow will provide a better understanding of the new compounds of the present invention as well as the novel method by which these new compounds are prepared.

Example I 1,4,4a,5,6,11b-hexahydro - 11H - benzo[a]carbazol-5-one (II) (6.0 g.) is suspended in 100 ml. of methanol and treated with 0.47 g. of sodium borohydride dissolved in 25 ml. of methanol. The reaction mixture is stirred at room temperature for one hour. A light yellow solution is obtained and vigorous hydrogen evolution is observed. The reaction mixture is poured onto ice water which contains enough hydrochloric acid to render the final pH slightly acidic. A white solid separates out, 1,4,4a,5,6,11b-hexahydro - 11H - benzo[a]carbazol-5-ol (III), in quantitative yield. A sample is recrystallized from a small amount of chloroform. The white rosettes melt at 176–177° C. IR spectrum shows a strong bond for the newly formed OH group $(3.1\mu)$. U.V. spectrum has the usual indole maxima at 278, 285, and 293 m$\mu$.

1,4,4a,5,6,11b-hexahydro - 11H - benzo[a]carbazol-5-ol (III) (2.4 g.) is dissolved in 10.0 ml. of pyridine and 2.1 g. of p-toluenesulfonyl chloride is added. The homogeneous reaction mixture is allowed to stand overnight at room temperature. Then the pyridine is removed in vacuo and the residue dissolved in ether. The ethereal solution is reacted with diluted hydrochloric acid, and water. After evaporation of the solvent, a white solid foam is obtained, which is recrystallized from ethyl acetate-petrol ether giving rise to small rosettes of 1,4,4a,5,6,11b-hexahydro - 11H - benzo[a]carbazol-5-ol, p-toluenesulfonate ester (IV) having an M.P. of 160–161° C. U.V. spectrum possesses the expected indole mixture at 278, 280, and 292 m$\mu$. IR spectrum shows no OH absorption.

p-Toluenesulfonate ester of 1,4,4a,5,6,11b-hexahydro-11H-benzo[a]carbazol-5-ol (IV) (5.7 g.) is covered with 20 ml. of diethylamine and heated in an autoclave at 120° C. for 16 hours. The cooled reaction mixture is diluted with 300 ml. of ether and the diethylamine-tosylate filtered off. The ethereal mother liquor is taken to dryness furnishing a white foam which weighs 4.27 g. (=87%). The crude product is dissolved in a minimum amount of methanol, from which the free base separates out, 5 - diethylamino - 1,4,4a,5,6,11b - hexahydro-11H-benzo[a]carbazole (V), M.P. 184–184.5° C. U.V. spectrum shows the characteristic indole absorption at 227, 283, and 291 m$\mu$.

Example II

Following the procedure of Example I, substituting diisopropylamine for the diethylamine used in the final step results in the production of 5-diisopropylamino-1,4,4a,5,6,11b-hexahydro-11H-benzo[a]carbazole.

Example III

Reacting diethylamine with 11-benzyl-1,4,4a,5,6,11b-hexahydro-11H-benzo[a]carbazol - 5 - ol - tosylate according to Example I results in 5-diethylamino-11-benzyl-1,4,4a,5,6,11b-hexahydro-11H-benzo[a]carbazole.

Example IV

Reacting dimethylamine with 4,8-diethyl-1,4,4a,5,6,11b-hexahydro-11H-benzo[a]carbazol - 5 - ol - tosylate according to Example I yields 4,8-diethyl-5-dimethylamino-1,4,4a,5,6,11b-hexahydro-11H-benzo[a]carbazole.

Example V

Following the procedure of Example I, 4,11-diethyl-5-dipropylamino-1,4,4a,5,6,11b-hexahydro - 11H - benzo[a]carbazole is prepared by reacting dipropylamine with 4,11-diethyl - 1,4,4a,5,6,11b - hexahydro - 11H - benzo[a]carbazol-5-ol-tosylate.

Example VI

Following the procedure of Example I, 11-benzyl-8,9-dimethoxy - 5 - diethylamino-1,4,4a,5,6,11b-hexahydro-11H-benzo[a]cahbazole is prepared by reacting 11-benzyl - 8,9 - dimethoxy-1,4,4a,5,6,11b-hexahydro-11H-benzo[a]carbazol-5-ol-tosylate with diethylamine.

Example VII

According to the method of previous examples, 8,9-dimethyl-5-morpholino - 1,4,4a,5,6,11b - hexahydro-11H-benzo[a]carbazole is prepared by reacting morpholine with 8,9-dimethyl-1,4,4a,5,6,11b-hexahydro - 11H - benzo[a]carbazol-5-ol-tosylate.

Example VIII

Substituting in the reaction of Example VII pyrrolidine for morpholine, there is obtained 8,9-dimethyl-5-pyrrolidino - 1,4,4a,5,6,11b - hexahydro - 11H - benzo[a]carbazole. Similarly, one obtains 8,9-dimethyl-5-piperidino-1,4,4a,5,6,11b-hexahydro - 11H - benzo[a]carbazole utilizing in the reaction of Example VII piperidine in lieu of morpholine.

Example IX

The p-toluenesulfonate ester of 1,4,4a,5,6,11b-hexahydro-11H-benzo[a]carbazol-5-ol (10.0 g.) is dissolved in 20 ml. of 25% (w./v.) ethanolic ammonia solution. The reaction mixture is heated in an autoclave at 130° C. for 16 hours. After cooling ether is added and the separated ammonium-tosylate filtered off. The filtrate is taken to dryness and recrystallized from ethyl acetate yielding 5-amino-1,4,4a,5,6,11b-hexahydro - 11H - benzo[a]carbazole, M.P. 219–220° C. U.V. spectrum had maxima at 227, 283 and 290 m$\mu$. IR spectrum shows the primary amine at 3.0$\mu$.

Example X

According to the method of Examples I and VII, 4-methyl - 5 - piperazino - 1,4,4a,5,6,11b - hexahydro-11H-benzo[a]carbazole is prepared by reacting 4-methyl-1,4,4a,5,6,11b-hexahydro - 11H - benzo[a]carbazol-5-ol-tosylate with piperazine. Similarly, substituting for piperazine an appropriate nitrogen containing heterocyclic compound, one obtains 4-methyl-5-thiomorpholino-1,4,4a,5,6,11b-hexahydro - 11H - benzo[a]carbazole and 4-methyl - 5 - morpholino-1,4,4a,5,6,11b-hexahydro-11H-benzo[a]carbazole. If the tosylate used is unsubstituted at the 4-position, there is obtained 5-thiomorpholino-1,4,4a,5,6,11b-hexahydro - 11H - benzo[a]carbazole and 5-morpholino-1,4,4a,5,6,11b-hexahydro - 11H - benzo[a]carbazole. Using an 11-benzyl substituted tosylate, one obtains an 1-benzyl-5-piperazino, 11-benzyl-5-thiomorpholino or 11-benzyl-5-morpholino-1,4,4a,5,6,11b-hexahydro-11H-benzo[a]carbazole.

Example XI

Reacting dimethylaminoethylamine with 8,9-dimethyl-11-ethyl-1,4,4a,5,6,11b-hexahydro - 11H - benzo[a]carbazol-5-ol-tosylate, one obtains 5 - (2 - dimethylaminoethyl)amino - 8,9 - dimethyl - 11 - ethyl-1,4,4a,5,6,11b-hexahydro-11H-benzo[a]carbazole.

While the present invention has been described above with some degree of particularity, it is to be understood that such description is not intended in any manner to be construed as a limitation on the scope of the invention. The invention is to be limited only by the claims appended hereto.

The invention claimed is:

1. A compound selected from the group consisting of (1) a compound having the formula:

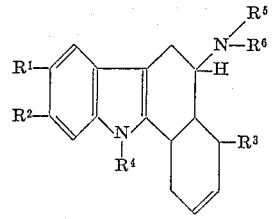

wherein $R^1$ and $R^2$ are selected from the group consisting of hydrogen, lower alkyl and lower alkoxy; $R_3$ is selected from the group consisting of hydrogen, lower alkyl and lower alkoxy; $R^4$ is selected from the group consisting of hydrogen, lower alkyl and benzyl; and $R^5$ and $R^6$ are selected from the group consisting of hydrogen, lower alkyl, dimethylaminoethyl and $R^5$ and $R^6$ together form a radical selected from the group consisting of morpholino, thiomorpholino, piperidino, piperazino, and pyrrolidino; and (2) the pharmaceutically acceptable, non-toxic acid addition salts thereof.

2. 5 - diethylamino - 1,4,4a,5,6,11b - hexahydro-11H-benzo[a]carbazole.

3. 5 - morpholino - 1,4,4a,5,6,11b - hexahydro - 11H-benzo[a]carbazole.

4. 5 - diethylamino - 11 - benzyl - 1,4,4a,5,6,11b-hexahydro-11H-benzo[a]carbazole.

5. 11 - benzyl - 5 - piperazino - 1,4,4a,5,6,11b,-hexahydro-11H-benzo[a]carbazole.

6. 8,9 - dimethoxy - 5 - diethylamino-1,4,4a,5,6,-11b-hexahydro-11H-benzo[a]carbazole.

7. 5 - amino - 1,4,4a,5,6,11b - hexahydro - 11H-benzo[a]carbazole.

8. 4,11 - diethyl - 5 - dipropylamino - 1,4,4a,5,6,11b-hexahydro-11H-benzo[a]carbazole.

9. 4 - methyl - 5 - piperazino - 1,4,4a,5,6,11b - hexahydro-11H-benzo[a]carbazole.

References Cited by the Examiner

Buchman et al.: J. Am. Chem. Soc., vol. 75 (1953), p. 6229.

Herr et al.: J. Am. Chem Soc., vol. 75, (1953), p. 5929.

Mosbach et al.: J. Am. Chem. Soc., vol. 76 (1954), p. 5800.

ALEX MAZEL, *Primary Examiner.*

HENRY J. JILES, *Examiner.*

RICHARD J. GALLAGHER, *Assistant Examiner.*